Dec. 25, 1923.

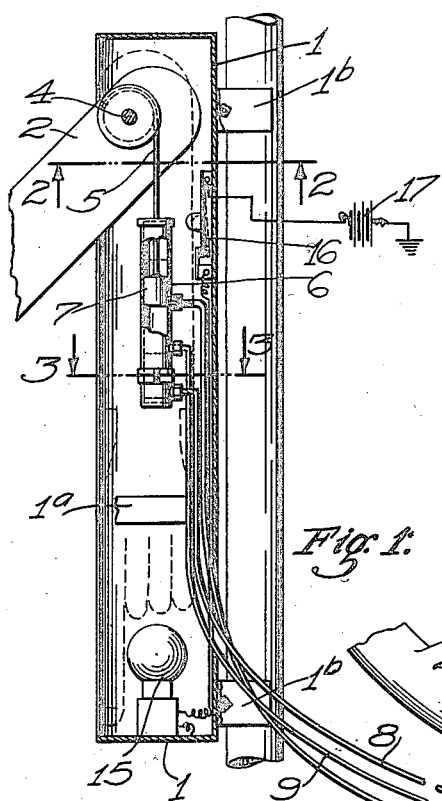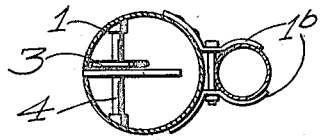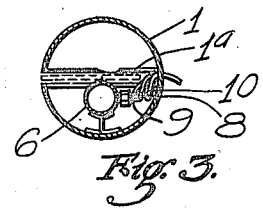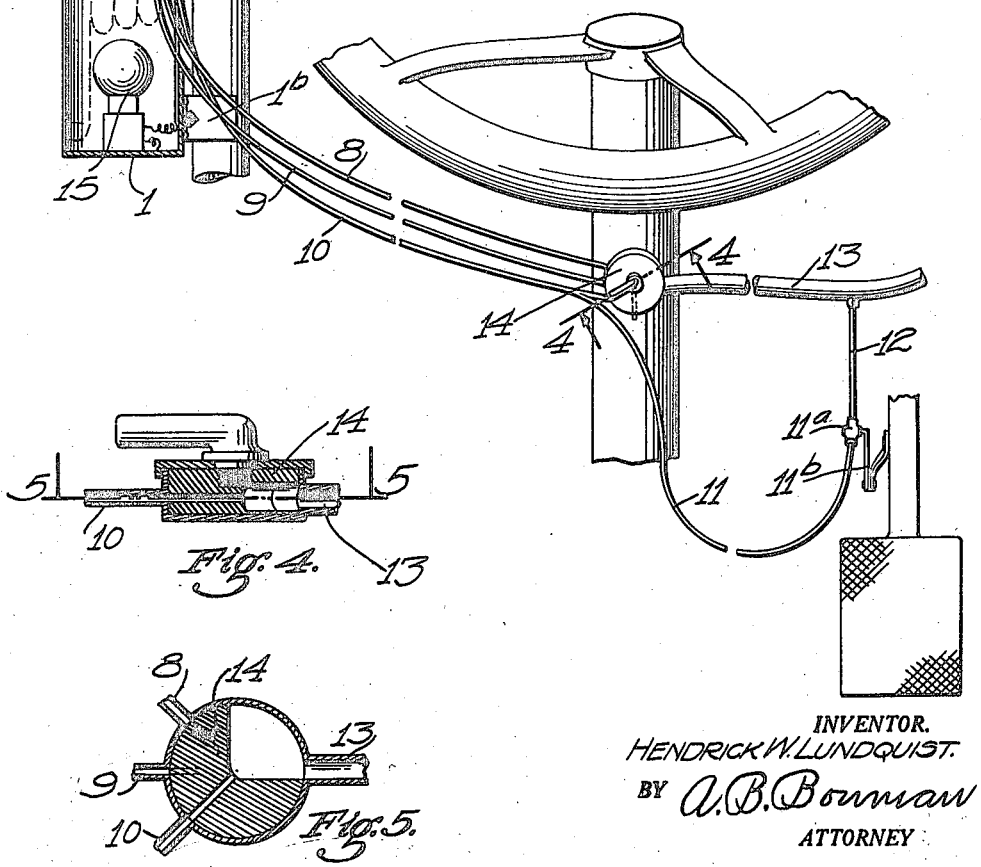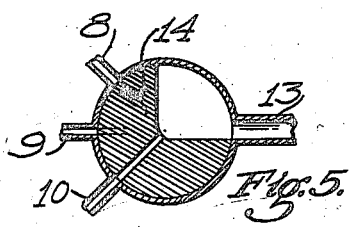

1,478,571

H. W. LUNDQUIST

VEHICLE DIRECTION INDICATOR

Filed Sept. 2, 1920    2 Sheets-Sheet 2

INVENTOR.
HENDRICK W. LUNDQUIST.
BY A.B.Bowman
ATTORNEY

Patented Dec. 25, 1923.

1,478,571

UNITED STATES PATENT OFFICE.

HENDRICK W. LUNDQUIST, OF SAN DIEGO, CALIFORNIA.

VEHICLE DIRECTION INDICATOR.

Application filed September 2, 1920. Serial No. 407,779.

*To all whom it may concern:*

Be it known that I, HENDRICK W. LUNDQUIST, a citizen of the United States, residing at San Diego, in the county of San Diego and State of California, have invented certain new and useful Vehicle Direction Indicators, of which the following is a specification.

My invention relates to an apparatus for indicating the direction a vehicle is about to take and the objects of my invention are: first, to provide a device of the semaphore type for indicating whether a vehicle will turn to the right or left, slow down or stop, determined by the position of the semaphore; second, to provide an apparatus of this class which is operated in its various stages by a source of energy produced by the vehicle; third, to provide an apparatus of this class which is operated from the steering post near the steering wheel of the vehicle and also in connection with the foot brake so that when the foot brake is operated the signal is always thrown to slow down or stop position; fourth, to provide an apparatus of this class which is applicable for use in connection with the various makes of vehicles now in use; fifth, to provide an apparatus of this class with a means of illumination whereby the semaphore is illuminated making it equally as efficient in the nighttime as in the daytime; sixth, to provide an apparatus of this class which is positive in its action and seventh, to provide an apparatus of this class which is very simple and economical of construction, durable, easy to install and which will not readily deteriorate or get out of order.

Figure 6:
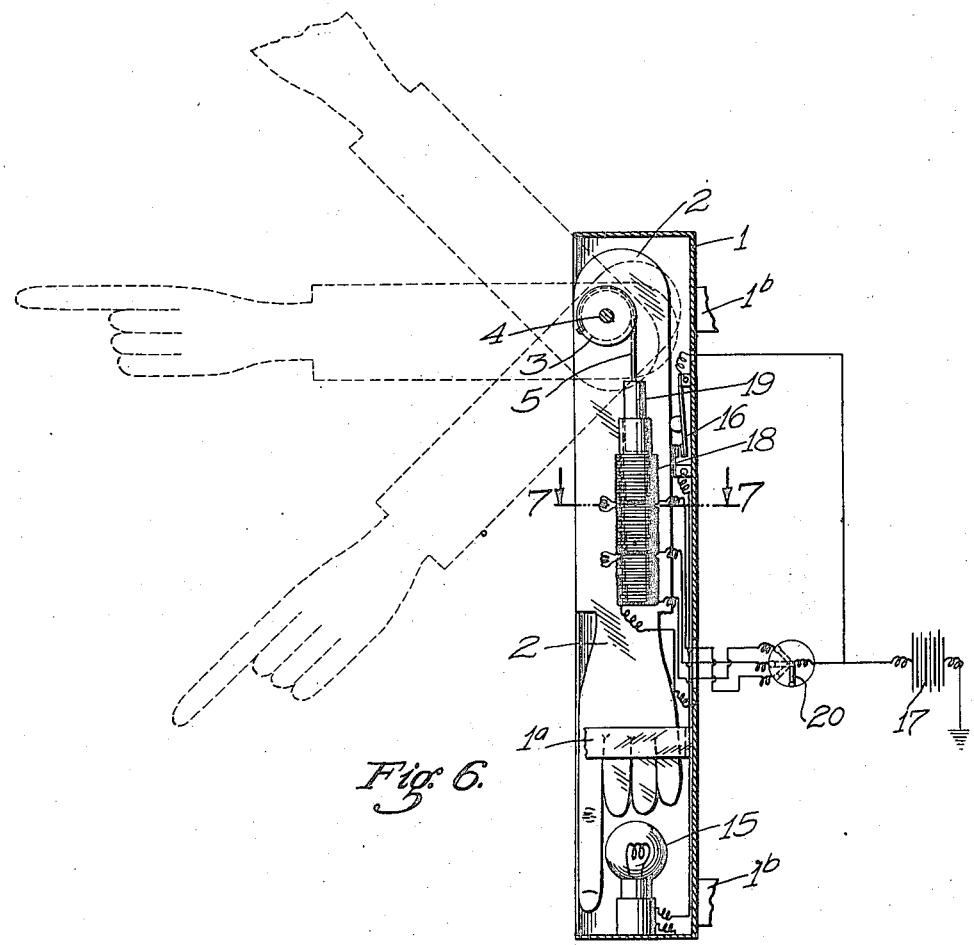
Figure 7:
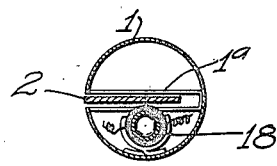

With these and other objects in view as will appear hereinafter my invention consists of certain novel features of construction, combination and arrangement of parts and portions as will be hereinafter described in detail and particularly set forth in the appended claims reference being had to the accompanying drawings and to the characters of reference thereon which form a part of this application in which:

Figure 1 is a partial sectional and diagrammatical view of the apparatus shown in position on the vehicle and showing some of the parts fragmentarily; Fig. 2 is a sectional view through 2—2 of Fig. 1; Fig. 3 is a sectional view through 3—3 of Fig. 1; Fig. 4 is a sectional view on an enlarged scale through 4—4 of Fig. 1; Fig. 5 is a sectional view through 5—5 of Fig. 4; Fig. 6 is a partial sectional and diagrammatical view of the device in a slightly modified form from that of Figs. 1 to 5 inclusive and Fig. 7 is a sectional view through 7—7 of Fig. 6.

Similar characters of reference refer to similar parts and portions throughout the several views of the drawings.

The casing 1, arm member 2, sheave 3, shaft 4, cable 5, cylinder 6, plunger 7, tubes 8, 9, 10, 11, 12 and 13, valve 14, lamp 15, switch 16 and battery 17 constitute the principal parts and portions of my indicator in one form.

The casing 1 is a cylindrical member closed at each end and provided with a slot in one side adapted for the arm 2 to pass through edgewise. Mounted in the upper end is a shaft 4 and pivotally mounted in this casing 1 and secured to this shaft is the arm member 2 and also secured to this shaft adjacent this arm member is a sheave 3 to which is secured the one end of the cable 5 which is adapted to wind on said sheave, said sheave being provided with flanges for retaining it in position. Secured in said casing at one side of the middle so that the arm member 2 clears the same is the cylinder 6 which is provided with a plunger 7 therein which is provided with a plunger rod 7ª which passes through the head of said cylinder for connection to the cable 5 so that with the reciprocation of the plunger, the sheave 3 is turned carrying with it the arm 2 depending upon the movement of the plunger in the cylinder. This cylinder 7 is provided with connections in certain predetermined positions on said cylinder for connecting the tubes 8, 9 and 10 so that said tubes communicate with the interior of said cylinder at intervals from the one end. These tubes communicate at their other end with a valve 14 which is a three way valve and the tube 10 which communicates with the upper connection connects with a tube 11 which extends around the valve 14 and in which is mounted a valve 11ª which is provided with a lever 11ᵇ which connects with the foot brake of the vehicle and the other side of said valve communicates with a tube 12 which connects with a tube 13 which connects with the intake manifold of the gas engine and its opposite end connects with the valve 14. Mounted in the side of the casing is an electrical switch 16 which is adapted to be engaged by the arm 2 when it is down in the neutral position as shown by dotted lines in Fig. 1 of the drawings and opens the circuit. This switch is in electrical connection with the battery 17 and electric light 15 which is mounted in the casing so that the light shines out through the slot in the one side for illuminating the arm member thus providing a means for automatically providing a light when the arm 2 is moved from a neutral position. This casing 1 is provided with spring guides 1ª which is adapted to receive the arm member and hold it in position from rattling and this cylindrical member 1 is secured to the wind shield post by means of clamp members 1ᵇ shown best in Figs. 1 and 2 of the drawings.

The operation of the apparatus is as follows: The tube 13 being connected with the intake manifold there is provided a vacuum pressure in the tube 13 which is conducted to the cylinder 7 to varying positions by means of the tubes 8, 9 and 10, for instance, if the valve is turned so that the vacuum pressure operates in the tube 10, the plunger 7 will be moved until it covers the connection, it being here noted that this tube 10 communicates with another tube 11 and with the pipe 13 so that it is operated directly by the pressure on the foot brake in case it has not been previously opened by the valve 14 thus providing for always operating the arm 2 with the operation of the brake lever. If it is desired to move the arm 2 to another position of approximately horizontal, the valve is turned so that the pressure communicates with the tube 9 and if it is desired to raise it to a position above the horizontal the pressure is communicated by the valve to the tube 8 thus providing for three different positions besides the neutral for indicating the various directions the vehicle is about to take.

In the modified form of construction shown in Figs. 6 and 7 of the drawings the structure is the same throughout, except that a graduated solenoid 18 is used with a core 19 which connects with the cable 5 and this solenoid is provided with three separate windings with separate connections and each provided with conductors which connect with a switch which connects with a source of electrical energy 17 so that the core 19 is moved to a certain position dependent upon the position of the switch 20 which operates the hand to various positions.

Though I have shown and described a particular construction, combination and arrangement of parts and portions and a certain modification thereof I do not wish to be limited to this particular construction, combination and arrangement, nor to the modification thereof but desire to include in the purview of my invention the construction, combination and arrangement substantially as set forth in the appended claims.

It is obvious that with this construction there is provided an apparatus which is provided with a three way control for operating an arm member to three different positions, the energy for operating the same being provided by the vehicle and that the device is operated in the first position, namely, slow down or stop position automatically with the movement of the brake lever.

Having thus described my invention what I claim as new and desire to secure by Letters Patent is:

1. A vehicle direction indicator including, a long, perpendicularly disposed casing, provided with a long, longitudinal opening in one side, an arm member pivoted therein near the upper end thereof and its free end adapted to rest in said casing when released, a cable in connection with said arm member and a continuous, graduated, three-section control means positioned in said casing for moving said cable to varying positions.

2. A vehicle direction indicator including, a long casing member, adapted to be secured to the windshield post in a perpendicular position, means for securing it in such position, a single arm member pivotally mounted in the upper end of said casing, and its free end adapted to rest in said casing when free, a flexible member in connection with said arm member adapted to move said arm member upon its pivotal mounting and a continuous, integral, plurality-section control means positioned in said casing, adapted to move said sectional member longitudinally to several varying positions, operative from the steering wheel of the vehicle.

3. A vehicle direction indicator including, a long casing member, adapted to be secured to the windshield post in a perpendicular position, means for securing it in such position, a single arm member pivotally mounted in the upper end of said casing, and its free end adapted to rest in said casing when free, a flexible member in connection with said arm member adapted to move said arm member upon its pivotal mounting and a continuous, integral, plurality-section control means positioned in said casing, adapted to move said sectional member longitudinally to several varying positions, operative from the steering wheel of the vehicle, and means for illuminating said arm member mounted in said casing and controlled by the position of said arm.

4. A vehicle direction indicator including, a long casing member, adapted to be secured to the windshield post in a perpendicular position, means for securing it in such position, a single arm member pivotally mounted in the upper end of said casing, and its free end adapted to rest in said casing when free, a flexible member in connection with said arm member adapted to move said arm member upon its pivotal mounting and a continuous, integral, plurality-section control means positioned in said casing, adapted to move said sectional member longitudinally to several varying positions, operative from the steering wheel of the vehicle, and means in said casing adapted to engage the extended end of said arm when in said casing for gripping it and holding it in position.

5. A vehicle direction indicator, including a vertically disposed casing provided with a slot in one side thereof, means for securing it in a vertical position on the windshield post of the vehicle, a single arm member pivotally mounted in the upper end of said casing operative in said slot, means for securely holding the free end of said arm when in said casing in a vertical position, a continuous plurality graduated means positioned in said casing for shifting said arm in varying positions on its pivotal axis, controlled from the steering wheel of the vehicle, and means positioned in said casing for illuminating said arm when extending out of said casing, controlled by the position of said arm on its pivotal mounting.

In testimony whereof, I have hereunto set my hand at San Diego, California, this 27th day of August, 1910.

HENDRICK W. LUNDQUIST.